June 11, 1957 R. McNABNEY 2,795,482
ABSORPTION OF IODINE VAPOR
Filed Sept. 22, 1950
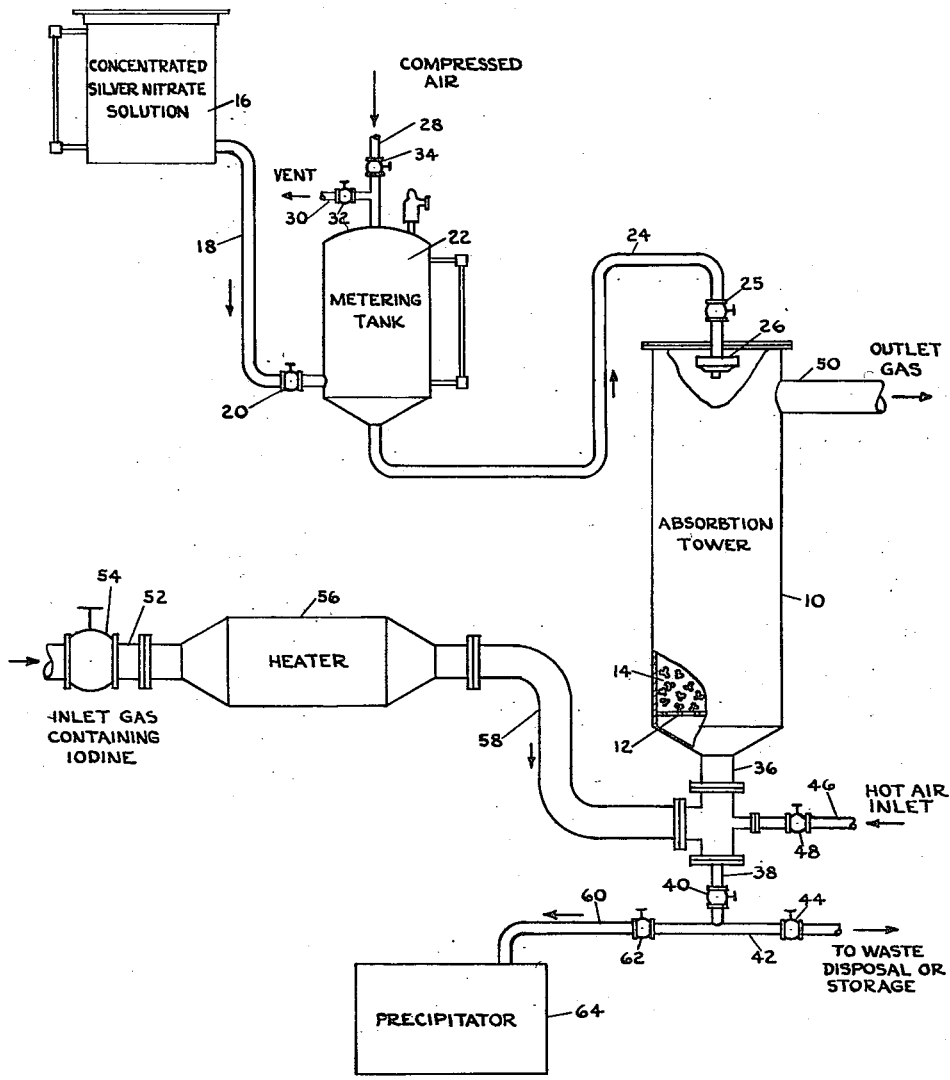
INVENTOR.
RALPH McNABNEY
BY [signature]
Attorney United States Patent Office 2,795,482
Patented June 11, 1957

2,795,482
ABSORPTION OF IODINE VAPOR

Ralph McNabney, Morristown, N. J., assignor to the United States of America as represented by the United States Atomic Energy Commission Application September 22, 1950, Serial No. 186,277

8 Claims. (Cl. 23—87)

This invention relates to the recovery of iodine from gaseous mixtures containing relatively small amounts of elemental iodine in vapor form. Such gaseous mixtures may be produced, for example, in the manufacture and purification of iodine or as an incident of the operation of a nuclear reactor. In the latter case the iodine may consist of or contain a radioactive isotope and as the description proceeds it will be apparent that the present method is well adapted for use in the recovery of such radio-iodine.

It is accordingly an object of the present invention to provide an improved method of recovering elemental iodine from gaseous mixtures containing relatively small amounts of the iodine. It is another object of the invention to provide a method of recovering iodine that is capable of removing the iodine substantially completely from such gaseous mixtures. It is still another object of the invention to provide a method of this type that is particularly useful for recovering radioactive iodine from such mixtures. Other objects of the invention will be in part obvious and in part pointed out hereafter.

In one of its broader aspects the present method comprises preparing an inert carrier having silver-bearing surface areas that are large in relation to the volume of the carrier and passing the mixed gas over the carrier under conditions which cause the elemental iodine to react with the silver of the silver-bearing surfaces to produce silver iodide. The method of the invention may be carried out satisfactorily by using metallic silver as the reactive surface layer on the inert carrier material and removing the iodine by the known reaction between iodine and metallic silver. However, it has been found that preferred results are obtained by using a layer of a silver salt such as silver nitrate on the carrier material. The silver nitrate can be more easily applied to the carrier surfaces than metallic silver and my experiments indicate that under the conditions described in detail below, somewhat more complete removal of the iodine can be achieved when using silver nitrate than when using metallic silver.

In a somewhat narrow aspect, the method of the present invention comprises treating an inert carrier, in particulate form and having a large surface area, with a concentrated aqueous solution of silver nitrate to wet the carrier surfaces with the solution, removing water from the wetted surfaces to deposit a layer of solid silver nitrate thereon and passing the mixed gas over the carrier to cause the iodine therein to react with the silver nitrate to form silver iodide. The carrier may be conveniently arranged in the form of a bed and the silver nitrate solution caused to flow down through the bed, thus wetting the surfaces of the carrier. Drying can be effected by passing hot air through the bed and the iodine-containing gas thereafter passed through the bed for removal of iodine therefrom by reaction with the deposited silver nitrate.

During the reaction period, the bed is preferably maintained at an elevated temperature that is sufficient to volatilize any nitric acid that may be formed as an incident of the reaction but is not high enough to volatilize the silver iodide formed as a reaction product. It has been found that the optimum temperature is in the neighborhood of 220° C.

It is apparent that a given quantity of carrier containing a given quantity of silver nitrate can absorb only a limited amount of iodine and must then be reactivated if it is to be used further. In cases where the quantity of iodine in the mixed gas is very small and the principal objective of the process is to produce a gas that is free from iodine, it may be economical to simply throw away the exhausted carrier material. On the other hand, if recovery of the separated iodine and re-use of the activated carrier is economically desirable, the reactivation may be readily carried out by again passing a concentrated solution of silver nitrate down over the carrier bed. It has been found that the concentrated solution of silver nitrate is capable of dissolving the silver iodide from the carrier surfaces with a high degree of efficiency. Moreover, this method of removing the silver iodide from the carrier bed possesses several other important advantages. Thus, as an incident of the silver iodide removal, the carrier surfaces are re-wetted with the silver nitrate solution and are in condition to be dried to form an active silver nitrate layer for absorption of further quantities of iodine. Moreover, the dissolved silver iodide can be very easily recovered from the solution merely by diluting it with water or dilute nitric acid, whereupon the silver iodide is precipitated.

The mechanism whereby the concentrated silver nitrate solution efficiently dissolves the silver iodide from the carrier surfaces is not completely understood. It may be that a complex ion is formed containing the iodine. In any event, my experiments clearly show that efficient reactivation of the carrier can be achieved by further treatment of the carrier with the concentrated silver nitrate solution.

The objects and advantages of the present method may be more fully understood and the method conveniently described by reference to the accompanying drawing which shows apparatus capable of carrying out a preferred embodiment of the present method. Referring to the drawing, the numeral 10 designates an absorption tower of generally conventional construction. In the drawing, the outer wall of tower 10 has been broken away near the bottom thereof to show its internal construction. Near the base of the tower there is a perforated plate 12 which supports a bed 14 of an inert particulate carrier which may be, for example, the well-known Berl saddles that have a surface area that is relatively large in relation to their volume.

Concentrated silver nitrate solution is supplied to the tower 10 from a storage tank 16. The solution from tank 16 flows through pipe 18 provided with a shut-off valve 20 to a metering tank 22 and thence through pipe 24 to a sprayhead 26 within the top of tower 10 through which it is sprayed on the top of the bed 14.

The solution is forced from metering tank 22 through sprayhead 26 by means of compressed air. The metering tank 22 is provided with a compressed air pipe 28 which leads from a suitable source of compressed air (not shown) to the top of tank 22. A vent pipe 30 is also connected to the top of the metering tank and valves 32 and 34 are provided in the vent pipe and compressed air pipe, respectively, for controlling the supply of compressed air to the tank and the venting of the tank 22 after the silver nitrate solution has been forced therefrom.

In initially activating the bed 14 of carrier material, the solution flows down through the bed and leaves the tower through pipe 36, then flows through pipe 38 containing valve 40 and branch pipe 42 containing valve 44 to a suitable storage point (not shown). When the desired quantity of solution has been forced from the metering tank, valves 25, 40 and 44 are closed and hot air is admitted to the base of the tower to dry the wetted surfaces of the carrier and form a layer of solid silver nitrate thereon. Hot air is supplied from a suitable source (not shown) and flows through pipe 46 containing shut-off valve 48 and pipe 36 to the base of the tower. The moist air from the top of the carrier bed leaves the tower through a discharge pipe 50.

When the carrier bed 14 has been dried, the hot air supply is shut off and the iodine-containing gas is passed through the tower. The iodine-containing gas enters the system through pipe 52 containing a shut-off valve 54 and flows first through a heater 56 wherein it is preheated. It has been found that if the absorption tower 10 is properly insulated, the heat of the gas is sufficient to maintain the bed 14 at the desired temperature, say 175° C. to 250° C., for securing rapid and complete reaction between the iodine and silver nitrate. The heated inlet gas leaving heater 56 flows through pipe 58 to pipe 36 and thence into the tower 10. As the gas flows up through bed 14, the iodine is removed in the manner previously described and the resulting iodine-free gas leaves the tower through discharge pipe 50.

When the bed 14 or a major portion thereof has absorbed as much iodine as it will absorb or has absorbed iodine to the point where the outlet gas contains an iodine concentration as great as that which can be tolerated, the inlet gas is shut off and a further quantity of the concentrated silver nitrate solution is caused to flow down through the bed wherein it dissolves the silver iodide as previously described. The resulting solution flows through pipes 36 and 38 and then through a branch pipe 60 containing a shut-off valve 62 to a precipitator 64 wherein the solution is diluted with either water or dilute nitric acid to precipitate silver iodide therefrom. If desired, the silver iodide precipitate can then be separated from the solution by filtration and the iodine recovered from the precipitate by known methods.

The exact concentration of the silver nitrate solution used for activating and reactivating the carrier material does not appear to be critical. However, it is desirable that this solution should be quite strong and good results have been obtained by using a 4 molar aqueous solution of silver nitrate that is 0.1 molar with respect to nitric acid. It has been found that when Berl saddles in the form of a bed as described above are wetted with this acidic silver nitrate solution, dried, and used to absorb iodine from a gaseous mixture containing 0.04 milligram per cubic foot, the efficiency of absorption is such that the iodine concentration of the outlet gas can be maintained at a level in the order of 0.1% of that of the inlet gas until about 30–40% of the silver nitrate in the bed has been converted to silver iodide. Thereafter the efficiency of removal of the iodine drops off somewhat unless the bed is reactivated.

It is, of course, to be understood that the foregoing description is illustrative only and that numerous changes may be made in the embodiment described. For example, the drying of the wetted carrier surfaces may be effected by simply passing the inlet gas through the bed without first using hot air. Under such circumstances, the heated inlet gas rapidly dries the wetted surfaces and the desired layer of solid silver nitrate is soon formed. Also, as previously indicated, reactivation of the carrier is optional where the economics of a particular embodiment of the process permit throwing away of the exhausted carrier material. Other modifications within the scope of the invention will be apparent to those skilled in the art.

I claim:

1. The method of separating elemental iodine vapor from a gaseous stream containing the same, which comprises dispersing silver nitrate on the surface of an inert carrier having a large surface area in relation to its volume to form a thin layer of solid silver nitrate on the surfaces of said carrier, passing said stream over said carrier to cause said iodine to react with said silver nitrate layer to form silver iodide when is retained on said carrier, and maintaining the temperature of said carrier at 175° to 250° C. while said stream is passed thereover.

2. The method of separating elemental iodine vapor from a gaseous stream containing the same, which comprises dispersing silver nitrate on the surface of an inert carrier having a large surface area in relation to its volume to form a thin layer of solid silver nitrate on the surfaces of said carrier, passing said stream over said carrier to cause said iodine to react with said silver nitrate layer to form silver iodide which is retained on said carrier, maintaining the temperature of said carrier at 175° to 250° C. while said stream is passed therover, and thereafter removing said silver iodide from said carrier.

3. The method of separating elemental iodine vapor from a gaseous stream containing the same, which comprises dispersing silver nitrate on the surfaces of an inert carrier having a large surface area in relation to its volume to form a thin layer of solid silver nitrate on the surfaces of said carrier, passing said stream over said carrier to cause said iodine to react with said silver nitrate layer to form silver iodide which is retained on said carrier, and thereafter passing a concentrated aqueous solution of silver nitrate over said carrier to remove silver iodide therefrom.

4. The method of separting elemental iodine vapor from a gaseous stream containing the same, which comprises treating with a concentrated aqueous silver nitrate solution an inert carrier having a large surface area in relation to its volume to wet the surfaces of said carrier with said solution, removing water from the thus wetted surfaces of the carrier to deposit a thin layer of solid silver nitrate thereon, passing said stream over said carrier to cause said iodine to react with said silver nitrate layer to form silver iodide which is retained on said carrier, and thereafter passing a concentrated aqueous solution of silver nitrate over said carrier to remove silver iodide therefrom.

5. The method of separating elemental iodine vapor from a gaseous stream containing the same which comprises establishing and maintaining a bed of discrete particles of an inert carrier, the particles of which have a large surface area in relation to their volume, flowing a concentrated aqueous solution of silver nitrate down through said bed to wet the surfaces of said particles of carrier, removing water from the thus wetted surfaces to deposit a thin layer of solid silver nitrate thereon, and passing said stream through said bed of carrier particles to cause said iodine to react with said silver nitrate layer to form silver iodide which is retained on said carrier.

6. The method of separating elemental iodine vapor from a gaseous stream containing the same, which comprises establishing and maintaining a bed of discrete particles of an inert carrier, the particles of which have a large surface in relation to their volume, flowing a concentrated aqueous solution of silver nitrate down through said bed to wet the surfaces of said carrier particles, passing hot air through said bed to remove water from said surfaces and deposit a thin layer of solid silver nitrate thereon, passing said stream through said bed to cause said iodine to react with said silver nitrate layer to form silver iodide which is retained on said carrier, maintaining said bed, during passage of said stream therethrough, at a temperature of 175° C. to 250° C., and thereafter removing said silver iodide from said carrier.

7. The method of separating elemental iodine vapor from a gaseous stream containing the same, which comprises establishing and maintaining a bed of discrete particles of an inert carrier, the particles of which have a large surface area in relation to its volume, flowing an approximately 4 molar aqueous solution of silver nitrate through said bed to wet the surfaces of said carrier with said solution, passing hot air through said bed to remove water from said carrier surfaces and deposit a thin layer of solid silver nitrate on said carrier, maintaining said bed at a temperature of about 220° C., passing said stream through said bed to cause said iodine to react with said silver nitrate layer to form silver iodide which is retained on said carrier, and again flowing an approximately 4 molar aqueous silver nitrate solution through said bed to dissolve silver iodide from the surfaces of said carrier.

8. The method of separating elemental iodine vapor from a gaseous stream containing the same, which comprises establishing and maintaining a bed of discrete particles of an inert carrier, the particles of which have a large surface area in relation to its volume, flowing an approximately 4 molar aqueous solution of silver nitrate through said bed to wet the surfaces of said carrier with said solution, passing hot air through said bed to remove water from said carrier surfaces and deposit a thin layer of solid silver nitrate on said carrier, maintaining said bed at a temperature of about 220° C., passing said stream through said bed to cause said iodine to react with said silver nitrate layer to form silver iodide which is retained on said carrier, again flowing an approximately 4 molar aqueous silver nitrate solution through said bed to dissolve silver iodide from the surfaces of said carrier, diluting the resulting solution to precipitate silver iodide therefrom, and separating the thus precipitated silver iodide from the solution.

References Cited in the file of this patent

UNITED STATES PATENTS

| | | |
|---|---|---|
| 1,766,646 | Jones | June 24, 1930 |
| 1,792,939 | Stampe | Feb. 17, 1931 |

FOREIGN PATENTS

| | | |
|---|---|---|
| 20,826 | Great Britain | of 1902 |

OTHER REFERENCES

Mellor: Inorganic and Theoretical Chemistry, vol. 2, page 95, (1946). Published by Longmans, Green, and Co., London.